(12) United States Patent  (10) Patent No.: US 7,533,531 B2
Prociw et al.                (45) Date of Patent:     May 19, 2009

(54) INTERNAL FUEL MANIFOLD WITH AIRBLAST NOZZLES

(75) Inventors: Lev Alexander Prociw, Elmira (CA); Aleksandar Kojovic, Oakville (CA); Harris Shafique, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 653 days.

(21) Appl. No.: 11/095,663

(22) Filed: Apr. 1, 2005

(65) Prior Publication Data

US 2006/0218925 A1    Oct. 5, 2006

(51) Int. Cl.
F02C 1/00     (2006.01)
F02G 3/00     (2006.01)

(52) U.S. Cl. .......................... 60/739; 60/746
(58) Field of Classification Search .................. 60/737, 60/739, 740, 742, 746, 747, 748, 734
See application file for complete search history.

(56) References Cited

U.S. PATENT DOCUMENTS

| | | | |
|---|---|---|---|
| 2,151,540 A | | 3/1939 | Varga |
| 2,676,461 A | * | 4/1954 | Gove ............................ 60/739 |
| 2,946,185 A | | 7/1960 | Bayer |
| 3,213,523 A | | 10/1965 | Boehler |
| 3,472,025 A | | 10/1969 | Simmons et al. |
| 4,028,888 A | * | 6/1977 | Pilarczyk ..................... 60/798 |
| 4,062,183 A | * | 12/1977 | Davies et al. ............ 60/39.094 |
| 4,100,733 A | | 7/1978 | Streibel et al. |
| 4,322,945 A | | 4/1982 | Peterson et al. |
| 4,404,806 A | | 9/1983 | Bell, III et al. |
| 4,499,735 A | * | 2/1985 | Moore et al. .................. 60/739 |
| 4,817,389 A | * | 4/1989 | Holladay et al. .............. 60/739 |
| 4,903,478 A | * | 2/1990 | Seto et al. ................. 60/39.281 |
| 4,941,617 A | | 7/1990 | Russell et al. |
| 5,036,657 A | | 8/1991 | Seto et al. |
| 5,226,287 A | * | 7/1993 | Ng ........................... 60/39.281 |
| 5,231,833 A | | 8/1993 | MacLean et al. |
| 5,253,471 A | | 10/1993 | Richardson |
| 5,271,219 A | | 12/1993 | Richardson |
| 5,289,685 A | * | 3/1994 | Hoffa ........................... 60/739 |
| 5,396,759 A | | 3/1995 | Richardson |
| 5,400,968 A | | 3/1995 | Sood |
| 5,419,115 A | | 5/1995 | Butler et al. |
| 5,423,178 A | | 6/1995 | Mains |
| 5,570,580 A | | 11/1996 | Mains |
| 5,579,645 A | | 12/1996 | Prociw et al. |
| 5,598,696 A | | 2/1997 | Stotts |
| 5,605,287 A | * | 2/1997 | Mains ......................... 239/402 |
| 5,653,109 A | * | 8/1997 | Overton et al. ................. 60/739 |

(Continued)

FOREIGN PATENT DOCUMENTS

CA          1013153        7/1977

(Continued)

*Primary Examiner*—William H Rodríguez
(74) *Attorney, Agent, or Firm*—Ogilvy Renault LLP (57) ABSTRACT

A gas turbine engine internal fuel manifold assembly including an annular fuel distribution member defining at least one fuel flow passage therein, and a plurality of fuel nozzles having spray tips mounted to the fuel distribution member. the spray tips are in fuel flow communication with the fuel flow passage, and each fuel nozzle has at least one core airflow passage extending through a center thereof between the spray tip and an air inlet defined in the fuel nozzle.

17 Claims, 5 Drawing Sheets

U.S. PATENT DOCUMENTS

| | | | |
|---|---|---|---|
| 5,771,696 A * | 6/1998 | Hansel et al. | 60/739 |
| 5,848,525 A * | 12/1998 | Spencer | 60/39.281 |
| 5,881,550 A * | 3/1999 | Toelle | 60/39.094 |
| 5,884,471 A * | 3/1999 | Anderson et al. | 60/39.23 |
| 5,884,483 A * | 3/1999 | Munro | 60/739 |
| 5,956,955 A | 9/1999 | Schmid | |
| 5,983,642 A | 11/1999 | Parker et al. | |
| 5,996,335 A | 12/1999 | Ebel | |
| 6,109,038 A | 8/2000 | Sharifi et al. | |
| 6,141,968 A | 11/2000 | Gates et al. | |
| 6,149,075 A | 11/2000 | Moertle et al. | |
| 6,189,321 B1 * | 2/2001 | Banhardt et al. | 60/739 |
| 6,240,732 B1 | 6/2001 | Allan | |
| 6,256,995 B1 | 7/2001 | Sampath et al. | |
| 6,463,739 B1 | 10/2002 | Mueller et al. | |
| 6,547,163 B1 * | 4/2003 | Mansour et al. | 239/404 |
| 6,755,024 B1 * | 6/2004 | Mao et al. | 60/776 |
| 6,761,035 B1 | 7/2004 | Mueller | |
| 6,823,677 B2 * | 11/2004 | Prociw et al. | 60/800 |
| 6,880,341 B2 * | 4/2005 | Parkman et al. | 60/740 |
| 6,883,332 B2 * | 4/2005 | Steinthorsson et al. | 60/776 |
| 7,028,484 B2 * | 4/2006 | Prociw et al. | 60/772 |
| 2003/0014979 A1 | 1/2003 | Summerfield et al. | |
| 2004/0040306 A1 | 3/2004 | Prociw et al. | |
| 2005/0039456 A1 | 2/2005 | Hayashi | |
| 2008/0053096 A1 * | 3/2008 | Morenko et al. | 60/734 |
| 2008/0083223 A1 * | 4/2008 | Prociw et al. | 60/739 |

FOREIGN PATENT DOCUMENTS

| | | |
|---|---|---|
| CA | 2307186 | 5/1999 |
| EP | 0 732 547 | 9/1996 |
| EP | 1 069 377 | 1/2001 |

* cited by examiner

INTERNAL FUEL MANIFOLD WITH AIRBLAST NOZZLES

TECHNICAL FIELD

The invention relates generally to a fuel conveying members in a gas turbine engines and, more particularly, to an improved fuel injection system.

BACKGROUND OF THE ART

Gas turbine engine fuel injection systems generally include fuel manifolds which interconnect a plurality of fuel injecting nozzles. Typically, a plurality of fuel nozzles are circumferentially distributed about the annular fuel manifold and form a nozzle array in the combustor for injecting fuel into the combustion chamber thereof. The fuel nozzles typically comprise injector tip assemblies which constitute either a pressure atomizing nozzle or an airblast nozzle. Pressure atomizing (or air assist) nozzles inject only fuel through the core of the nozzle and use air flow about the central core to direct and atomize the fuel spray. Pure airblast nozzles provide a core airflow about which the fuel is delivered, such that energy from the core air, rather than hydraulic pressure, is used to help develop the fuel spray. Generally, airblast nozzles have less propensity for contamination and carbon deposit build-up, as the fuel passages in the nozzles tips are larger and the core air flow reduces the likelihood of carbon in the injected fuel recirculation zone condensing and accumulating on the nozzle tip surfaces.

Therefore, airblast nozzles with an air core have improved longevity, require less maintenance and are typically less expensive to manufacture than their pressure atomizing nozzle counterparts. However, incorporating such airblast nozzles with an internal fuel manifold, such as the type described in Applicant's published U.S. application US2004/0040306, may result in undue heating of the interior of the fuel manifold as a result of the flow of core air though the body of the manifold defining the main fuel passage therein. Keeping the interior of the fuel manifold near fuel temperature is important to prevent contamination in fuel passages from coking.

Therefore, there is a need for an improved fuel injection system.

SUMMARY OF THE INVENTION

It is therefore an object of this invention to provide an improved fuel injection system.

In one aspect, the present invention provides a gas turbine engine internal fuel manifold assembly comprising: an annular fuel distribution member defining at least one fuel flow passage therein; and a plurality of fuel nozzles mounted to said fuel distribution member and having spray tips in fuel flow communication with said at least one fuel flow passage, each of said fuel nozzles having at least one airflow passage extending therethrough between said spray tip and an air inlet defined in said fuel nozzle, said at least one airflow passage being in communication with an air source independently of said fuel distribution member.

In another aspect, the present invention provides a fuel injection system of a gas turbine engine comprising: an annular fuel manifold having a body defining at least one fuel flow passage therein; and a plurality of fuel nozzles disposed in fuel flow communication with said at least one fuel flow passage, said fuel nozzles being radially offset from said fuel manifold body such that a central spray axis of each of said fuel nozzles is spaced apart from said fuel manifold body, said fuel nozzles having a core airflow passage defined therethrough and having at least one air inlet in communication with said core airflow passage, said core airflow passage adapted to direct air therethrough for propelling fuel from said fuel flow passages.

In another aspect, the present invention also provides a fuel injection system of a gas turbine engine, the system comprising a fuel manifold, a plurality of nozzles mounted to said manifold and having spray tips for injecting an air/fuel mixture into a combustor, each of said nozzles defining centrally therein at least one core airflow passage in communication with said spray tip and at least one fuel flow passage providing fluid flow communication between said fuel manifold and said spray tip, said fuel passage being concentric with and disposed around said air passage at said spray tip, said system further comprising means for directing air to an inlet of said airflow passage independently of the manifold.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 2b is a schematic partial rear perspective view of the fuel injection system of FIG. 2a;

FIG. 3 is a cross-sectional view taken through line 3-3 of FIG. 2a; and

DETAILED DESCRIPTION OF THE PREFERRED EMBODIMENTS

Figure 1:
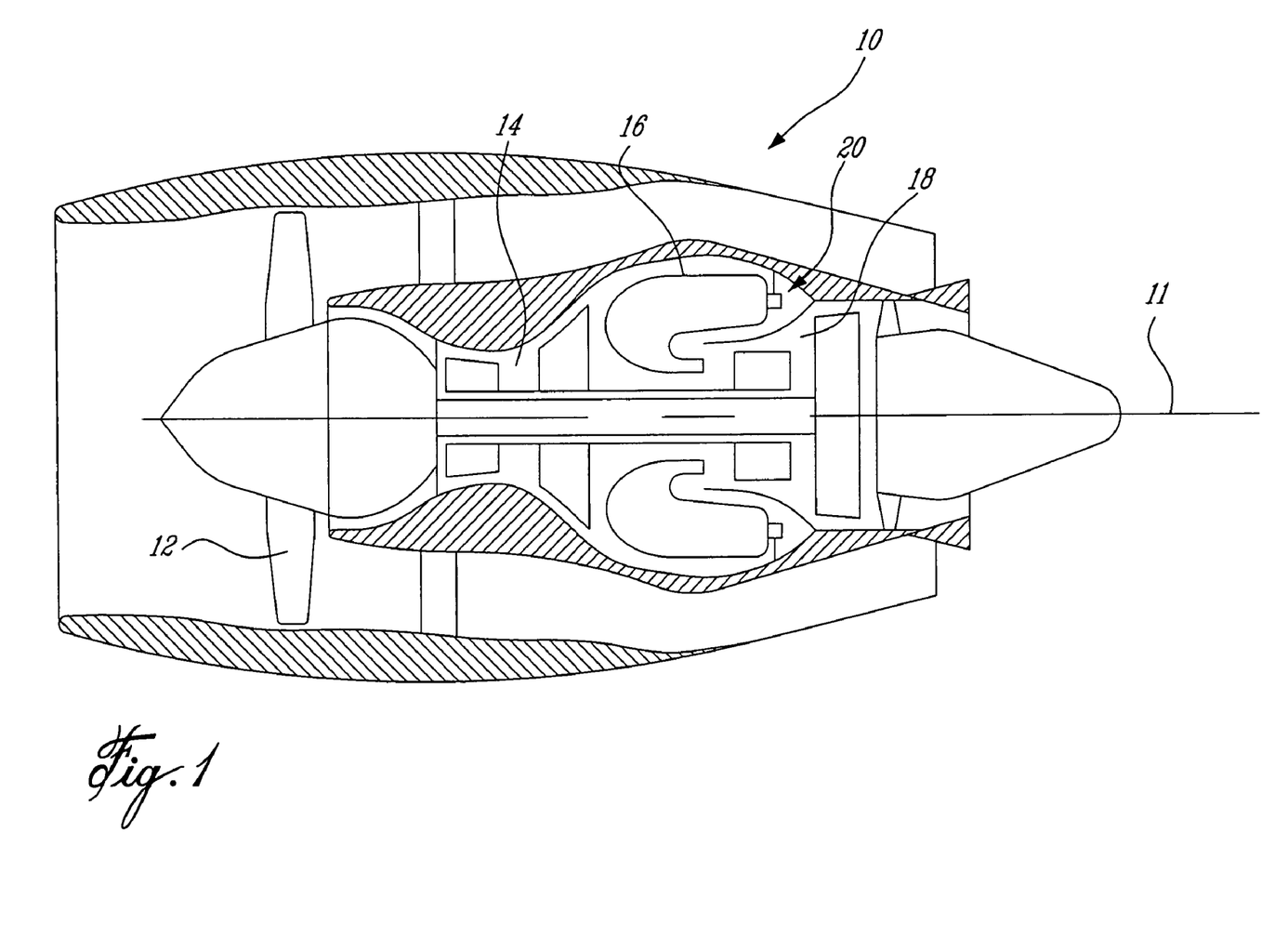
FIG. 1 is a schematic cross-section of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel injection system 20, which includes a fuel source (not shown) and at least one fuel conveying assembly or internal fuel manifold 22, is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

Figure 2A:
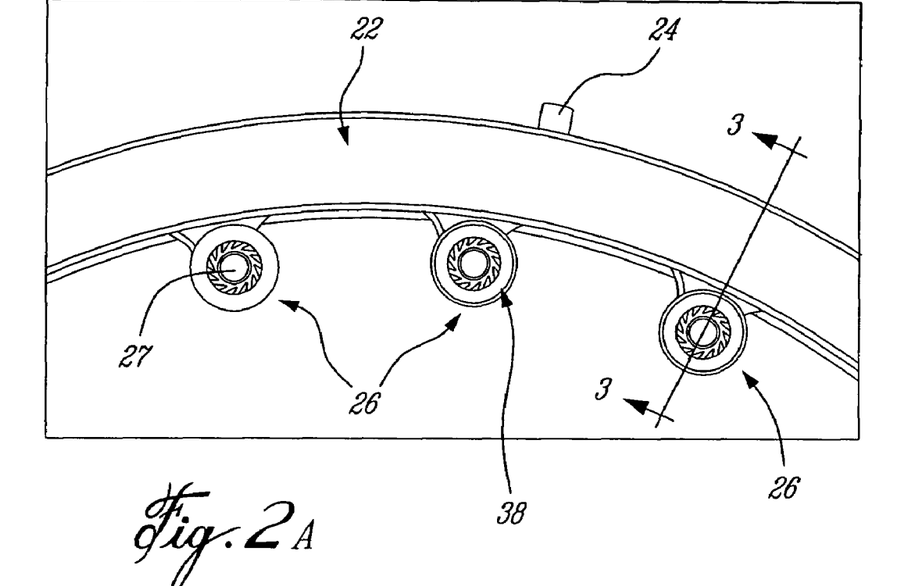
FIG. 2a is a schematic partial front perspective view of a fuel injection system in accordance with one embodiment of the present invention, including an annular fuel manifold and a plurality of airblast fuel nozzles spaced thereabout.
Figure 2B:
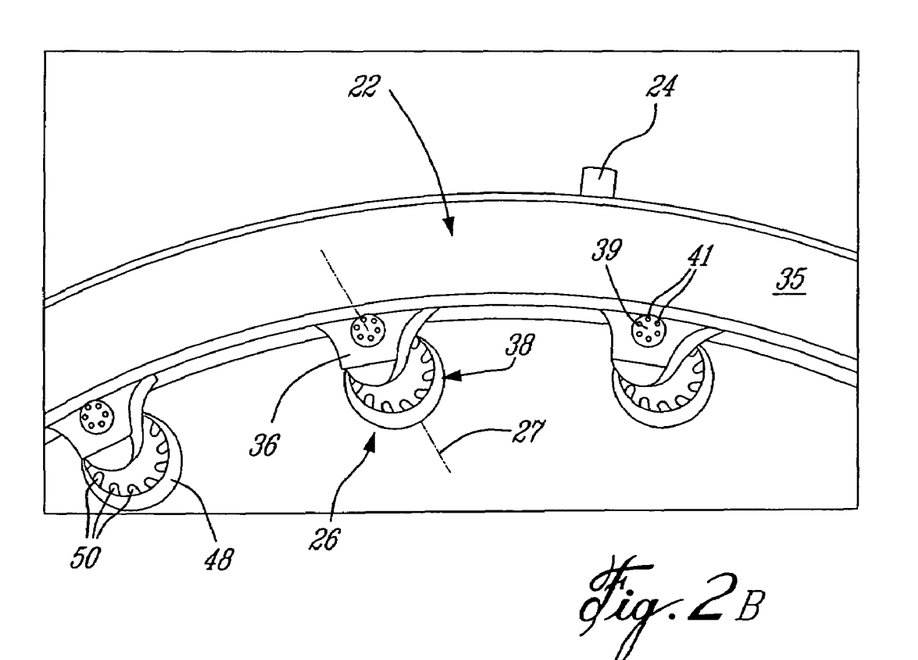
Figure 3:
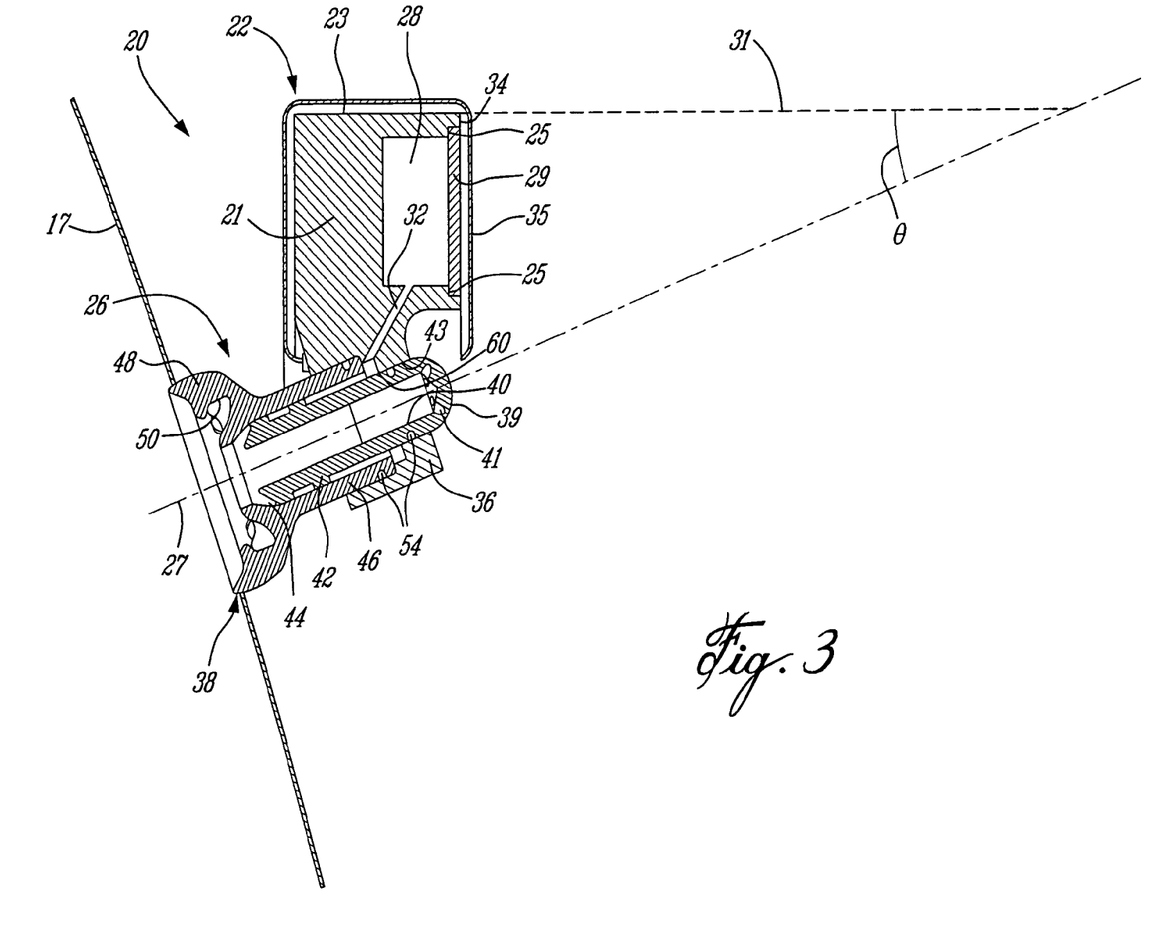

Referring to a first embodiment of the present invention as depicted in FIGS. 2a to 3, the fuel injection system 20 comprises generally the fuel distribution member 22, or annular fuel manifold 22, and a plurality of fuel nozzles 26 mounted thereto and adapted to inject a fuel/air mixture into the combustion chamber of the gas turbine engine's combustor 16. The fuel nozzles 26 particularly include spray tips 38 which project into the combustor 16. The annular fuel manifold 22 is mounted adjacent to the combustor 16 outside an upstream end thereof, preferably to surrounding casing support structure within the gas turbine engine 10 via several radially extending locating pins 24. The locating pins 24 are received within lugs (not shown) defined in the support structure such that relative movement between the fuel manifold 22 and the surrounding support casing is permitted, thereby accommodating any thermal growth mismatch which may occur between the cold fuel manifold 22 and the relatively hot engine casing within which the manifold is mounted. Preferably, the heat shield 35 which encloses the annular fuel manifold is also mounted independently on these locating pins 24 without touching the manifold 22, thus avoiding any temperature gradient induced stress which may occur therebetween.

The plurality of fuel nozzles 26 are said to be "pure" airblast nozzles, namely nozzles which direct a large central core airflow therethrough, the energy of this core airflow provides sufficient energy to entrain fuel that is delivered thereabout within the nozzle structure for ejection of the resulting air/fuel mixture out of the spray tip 38 of the fuel nozzles 26. Thus, in contrast to pressure atomizing (or air assist) fuel nozzles which inject only fuel through the core passage of the nozzle, such airblast fuel nozzles 26 define a core airflow passage 40 that extends through the center thereof as will be described in further detail below with reference to FIG. 3. The pure airblast fuel nozzles 26 are mounted to the fuel manifold ring 22 about the circumference thereof, and are preferably evenly distributed thereabout. The spray tip 38 of each fuel nozzle 26 is disposed in fuel flow communication with a fuel flow passage 28 of the fuel manifold 22. However, each fuel nozzle 26 is radially offset from the main body of the fuel manifold ring 22 such that a generally or substantially unobstructed (i.e. by the manifold or heat shields) flow of air may enter via air inlets 41 in the rear body 39 of the fuel nozzle (disposed outside the combustor) and is subsequently fed through the central core passage of each airblast nozzle 26 without passing through the fuel conveying body of the fuel manifold ring 22. Thus, the airflow passing through the central core passage 40 of the airblast fuel nozzles 26, which is used by the airblast nozzle 26 to inject the fuel spray into the combustion chamber, is separated or independent from (i.e. does not pass through) the fuel distribution manifold 22. Heat transfer communication between the fuel in the fuel flow passages of the manifold and the flow of airblast air through the nozzle assembly is thus limited, as the manifold is not detrimentally heated by the passing of fuel nozzle air through the manifold to the fuel nozzle.

A plurality of mounting members 36, preferably integrally formed with the main body of the fuel manifold 22, radially extend inwardly therefrom and define an opening 43 within which the main body 42 of each fuel nozzle 26 is received, such that the fuel nozzle bodies are radially offset from the fuel manifold so that the manifold 22 does not significantly obstruct or come into significant contact with an air flow entering inlets 41. As a heat shield 35 encloses the main body of the fuel manifold 22, preferably only these mounting members 36 of the fuel distribution member are exposed. The mounting members 36 radially project within the ring of the annular fuel manifold 22 sufficiently such that at the centerline 27 of the plurality of spray tips 38 define a circle having a diameter which is smaller than that of the radial innermost peripheral surface 60 of the annular fuel manifold 22 adjacent the nozzle 26. Each fuel nozzle 26 defines a central spray axis 27 about which the fuel spray is injected into the combustion chamber of the engine, the axis 27 extending fore-aft relative to the engine without intersecting the body of the fuel manifold ring 22. Thus, the central axis 27 is concentric with the core airflow passage 40 of the fuel nozzles 26, and extends between the air inlet to the fuel nozzle and the spray tip exit without intersecting the body of the fuel manifold 22.

Figure 4:
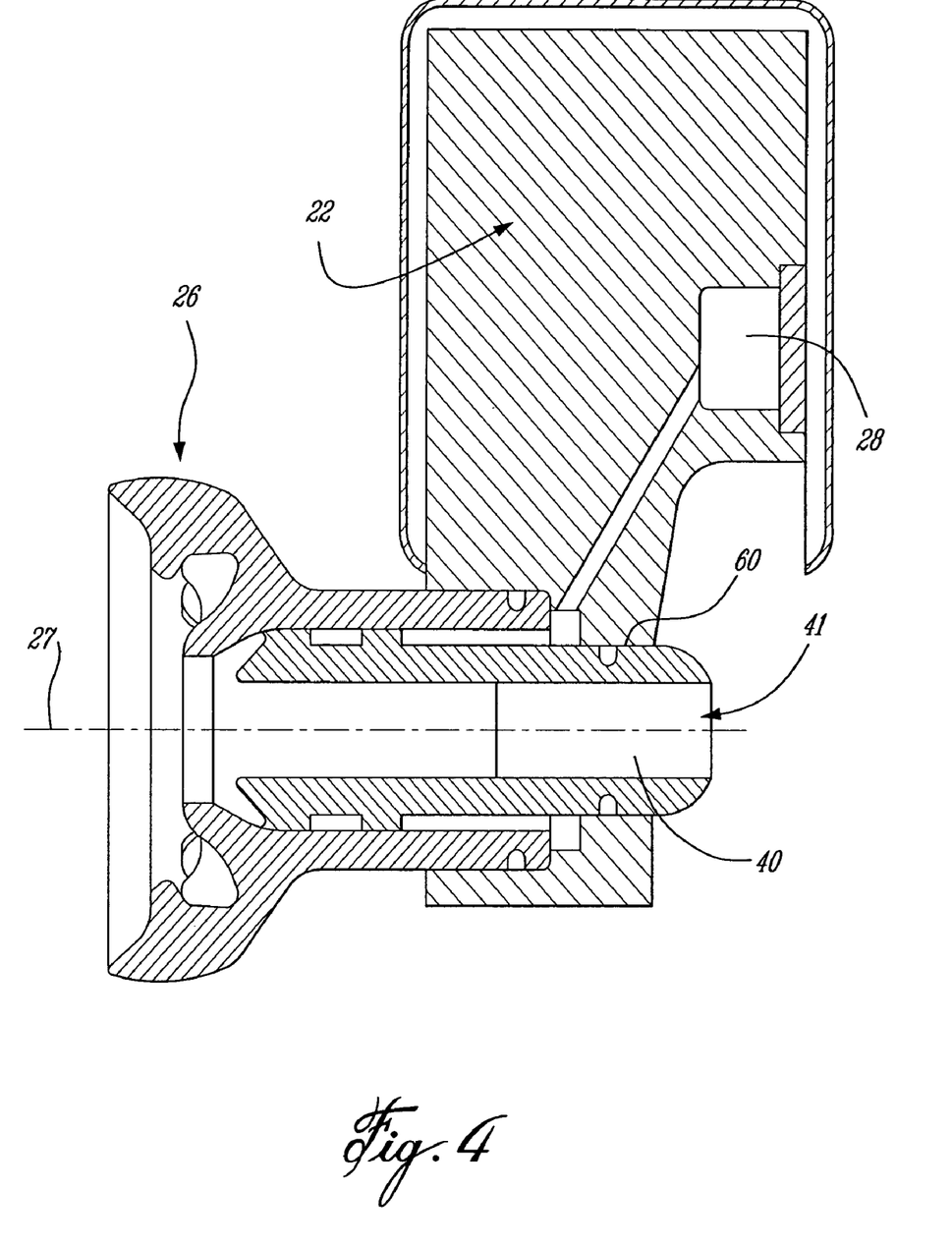
FIGS. 4 and 5 are cross-sectional views, similar to FIG. 3, of alternate embodiments.
Figure 5:
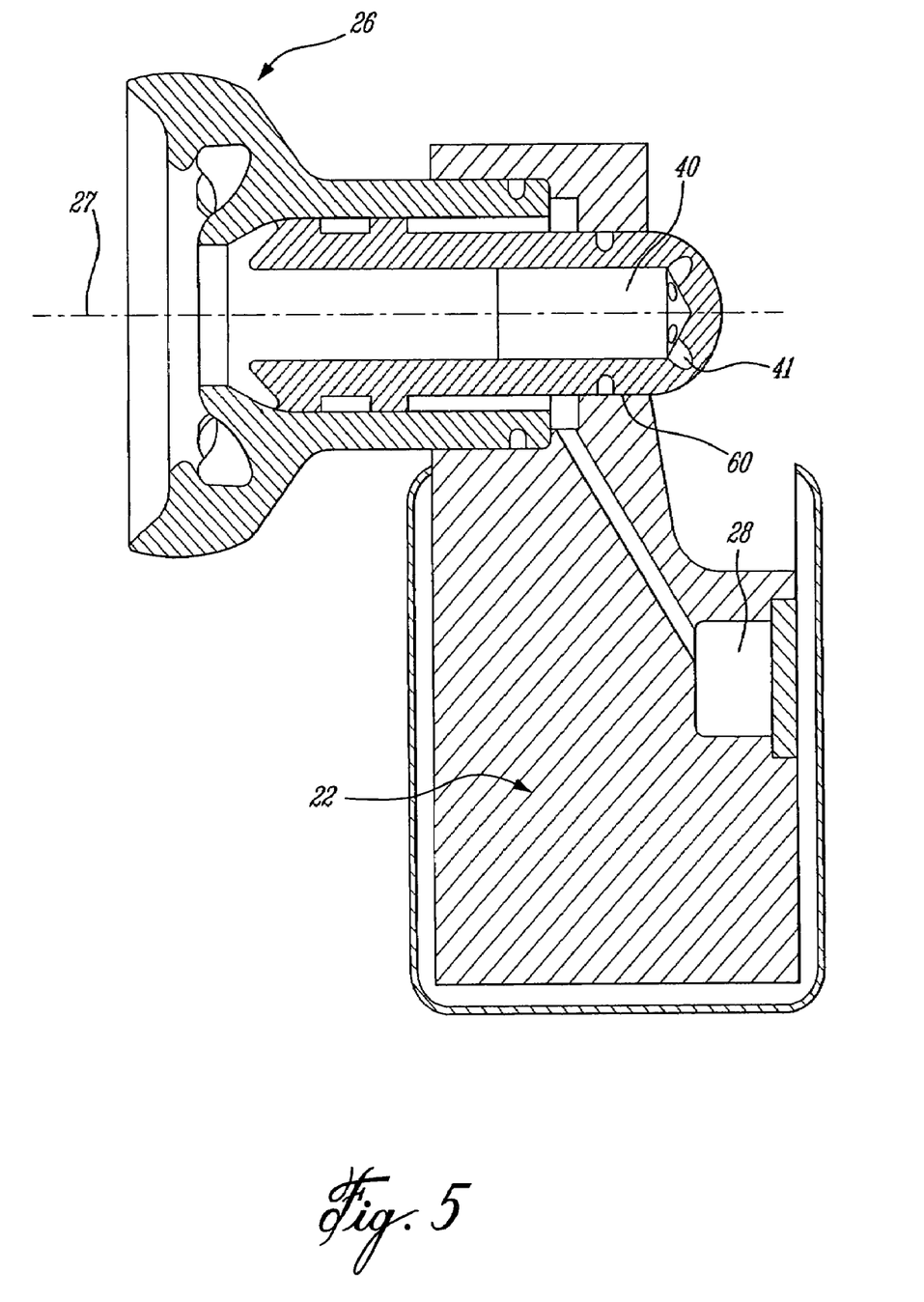

Referring now in detail to FIG. 3 in more detail, each airblast fuel nozzle 26 provides a core flow of air through central airflow passage 40 defined in the main body 42 of the nozzle, the air entering at a rearward (relative to the fuel nozzle spray direction) or upstream end 39 of the nozzle body via air inlet openings 41 and exiting through the nozzle spray tip 38 at the downstream end of the fuel nozzle which is aligned with a corresponding opening in the combustor wall 17. In FIG. 3, inlets 41 are provided with radial and tangential components relative to axis 27, which impart a swirl to the air entering central passage 40. The size of inlets 41 may be selected to meter core air. The central spray axis 27 extends through the airflow passage 40 and is concentric therewith. The central axis 27 of each fuel nozzle 26 may define an angle $\theta$ relative to a line 31 which corresponds to an outer surface 23 of the main body 21 of the annular fuel manifold 22, with the axis 27 and the line 31 intersecting at a point located rearward of the fuel nozzle and manifold such that the spray tips 38 of the fuel nozzles 26 concentric with the axis 27 point radially inwards toward the center of the combustor 16 of the gas turbine engine 10. This angle is provided, for example, when the manifold 22 is used with a conical combustor. Referring to the alternate embodiment in FIGS. 4 and 5, however, the nozzles 26 may also be provided in a configuration where $\theta=0$. Also, inlet 41 provides a single, axial entrance to passage 40. Referring particularly to the embodiment of FIG. 5, the mounting members 36 radially project from the ring of the annular fuel manifold 22 sufficiently such that the centerline 27 of the plurality of spray tips 38 define a circle having a diameter which is larger than that of the radial outermost surface of the annular fuel manifold 22. In a further embodiment not depicted, mounting members 36 project alternately radially inwardly and radially outwardly, to provide two concentric arrays of fuel nozzles. In a still further embodiment not shown, mounting members 36 may be provided in varying distances from manifold 22 (i.e. from the inside, or the outside, or both), to provide two or more concentric arrays of fuel nozzles.

The airblast fuel nozzles 26 of the fuel injection system 20 are therefore incorporated into the internal fuel manifold 22, but separated or radially offset therefrom sufficiently such that the core air fed through the fuel nozzles does not have to pass through the body of the manifold. By locating at least the inlet opening(s) 41 of the fuel nozzles offset, and preferably the nozzle centreline offset from, from the body of the fuel manifold permits air for the airblast nozzles to enter the nozzle at the rear thereof, flow along the central axis of the nozzle and exit at the spray tip concentrically to the fuel flow and outer air flow. Thus, heating of the manifold by a hot airflow passing through the assembly is limited and preferably prevented. As such, the propensity for coking of the fuel to occur within the fuel manifold or the fuel nozzles is reduced.

The fuel nozzle 26 includes an inner main body 42 disposed within a surrounding outer nozzle body portion 46 which defines the spray tip 38 at the downstream end thereof. A radial gap is defined between the inner and outer nozzle body portions 42, 46 and is disposed in fluid flow communication with at least one fuel flow passage 28 of the fuel manifold 22 via at least one connecting fuel passage 32. Thus, fuel from the manifold's fuel flow passage 28 is fed to the radial gap defined between the fuel nozzle body portions, and exits therefrom in an annular spray at the fuel spray nozzle opening 44 disposed around the central core airflow passage 40. Additional swirling air may also be provided at the outlet of the nozzle's spray tip 38, and extends through a plurality of circumferential air swirl passages 50 defined in the outer air swirler portion 48 of spray tip 38. The inner and outer body portions 42, 46 of the fuel nozzle body are provided within the stepped cylindrical opening 43 defined in the mounting members 36 which radially project inwardly from the main body 21 of the annular fuel manifold 22. Sealing elements 54, preferably braze ring seals, are provided between each of the fuel nozzle body portions 42, 46 and the surrounding mounting member 36 to prevent the escape of fuel therefrom. Reference may be made to Applicant's U.S. Pat. No. 6,082,113, incorporated herein by reference, for other design aspects of such nozzles.

Each fuel nozzle 26 is fed by fuel flow passage 28 of the manifold. Particularly, the fuel flow passage 28 is defined in the body 21 of the fuel manifold 22 and is preferably formed therein by machining (preferably by a turning operation) a channel within an outer surface thereof, such as the rearward surface 34. The channel 28 is sealingly enclosed by a sealing plate 29 which is fastened to annular flanges 25. A heat shield 35 is preferably also provided, the heat shield 35 extending about the body 21 of the fuel manifold 22 while defining a small air gap therebetween, such undue heating of the fuel flowing within the manifold is avoided. The heat shield 35 therefore protects the exterior of the manifold to maintain the majority of the structure near the temperature of the fuel.

The above description is meant to be exemplary only, and one skilled in the art will recognize that changes may be made to the embodiments described without department from the scope of the invention disclosed. For example, although one fuel flow passage is described within the fuel manifold 22, two or more fuel flow passages may also be used, such as in the configuration described in the Applicant's published U.S. application US2004/0040306, or any other suitable configuration. The internal configuration of the internal manifold forms no part of the present invention. Although complete radial offset or complete unobstruction of the air inlets 41 is preferred and thus described above, the skilled reader will appreciate that partial offset (i.e. partial obstruction) may be present and yet still achieve the beneficial result of the invention taught herein. Consequently the term "substantially unobstructed" may be used to describe an airflow which does result in significant heating of the manifold/heat shield by reason of incidental contact occurring between the airflow and the manifold/heat shield as air enters inlets 41. Further, although described with respect to pure airblast fuel nozzles, other types of fuel nozzles may also be employed, as may alternate manifold configurations and construction methods. Still other modifications will be apparent to those skilled in the art, in light of a review of this disclosure, and such modifications are intended to fall within the appended claims.

The invention claimed is:

1. A gas turbine engine internal fuel manifold assembly comprising:
an annular fuel distribution manifold having a solid annular body and at least one circumferentially-extending fuel flow passage defined in the solid annular body; and
a plurality of fuel nozzles directly mounted to said fuel distribution manifold, and having spray tips in fuel flow communication with said at least one fuel flow passage, each of said spray tips having at least one core airflow passage extending through a center thereof between a spray tip outlet and an air inlet defined in said fuel nozzle, said inlet being in communication with an air source independently of said fuel distribution member, said fuel nozzles each defining a central spray axis concentric with said at least one core airflow passage, and wherein said fuel nozzles are mounted in a radially offset manner relative to said fuel distribution manifold such that said central spray axis extends through said fuel nozzle between said spray tip and said air inlet without intersecting said annular fuel distribution manifold.

2. The fuel manifold assembly as defined in claim 1, wherein the fuel nozzles are mounted to the solid annular body by a lug portion of the annular fuel distribution manifold, the lug portion surrounding the spray tip.

3. The fuel manifold assembly as defined in claim 1, wherein the at least one circumferentially-extending fuel flow passage is machined into a periphery of the solid annular body.

4. The fuel manifold assembly as defined in claim 1, wherein said air inlets of said fuel nozzles comprise a plurality of inlets on each nozzle, said plurality of inlets being in communication with said airflow passage through the nozzle.

5. The fuel manifold assembly as defined in claim 4, wherein said plurality of inlets are arranged to introduce a swirl to airflow in the airflow passage.

6. The fuel manifold assembly as defined in claim 1, wherein said inlets of said fuel nozzles are adapted to meter airflow admitted to the airflow passage.

7. The fuel manifold assembly as defined in claim 1, wherein said fuel nozzles have central axes which are radially offset from said annular fuel manifold.

8. The fuel manifold assembly as defined in claim 1, wherein said spray tips are arranged in a circular array having a diameter different than that of an adjacent peripheral surface of the annular fuel manifold.

9. The fuel manifold assembly as defined in claim 8, wherein said diameter is less than an inner peripheral surface of the annular fuel manifold.

10. The fuel manifold assembly as defined in claim 8, wherein said diameter is greater than an outer peripheral surface of the annular fuel manifold.

11. The fuel manifold assembly as defined in claim 1, wherein said fuel nozzles are airblast fuel nozzles, and where the fuel nozzles are supported in a lug portion of the annular fuel distribution manifold, the lug portion surrounding the spray tip.

12. A fuel injection system of a gas turbine engine comprising:
an internal annular fuel manifold having a solid body in which at least one fuel flow passage is defined; and
a plurality of fuel nozzles directly disposed on the solid body in a radially offset position relative thereto and in fuel flow communication with said at least one fuel flow passage, said fuel nozzles being radially offset from said fuel manifold body such that a central spray axis of each of said fuel nozzles is spaced apart from said fuel manifold body, at least some of said fuel nozzles being radially offset beyond an adjacent peripheral surface of the fuel manifold, said fuel nozzles having a core airflow passage defined therethrough and having at least one air inlet in communication with said core airflow passage, said core airflow passage adapted to direct air therethrough for propelling fuel from said fuel flow passages.

13. The fuel injection system as defined in claim 12, wherein the at least one fuel flow passage is machined into a periphery of the solid body and circumferentially-extends about the annular fuel manifold.

14. The fuel injection system as defined in claim 12, wherein at least some fuel nozzles are outwardly radially offset relative to the manifold.

15. The fuel injection system as defined in claim 12, wherein said air inlet of said fuel nozzles comprises a plurality of inlets on each nozzle, said plurality in communication with a single said airflow passage through the nozzle.

16. The fuel injection system as defined in claim 15, wherein said plurality of inlets are arranged to introduce a swirl to airflow in the airflow passage.

17. The fuel injection system as defined in claim 12, wherein said air inlets of said fuel nozzles are adapted to meter airflow admitted to the airflow passage.

* * * * *